(12) United States Patent
Ohmori et al.

(10) Patent No.: US 9,551,860 B2
(45) Date of Patent: Jan. 24, 2017

(54) INFRARED-REFLECTIVE FILM

(75) Inventors: Yutaka Ohmori, Osaka (JP); Hisashi Tsuda, Osaka (JP); Motoko Kawasaki, Osaka (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 353 days.

(21) Appl. No.: 14/342,922

(22) PCT Filed: Jul. 24, 2012

(86) PCT No.: PCT/JP2012/068716
§ 371 (c)(1),
(2), (4) Date: Mar. 5, 2014

(87) PCT Pub. No.: WO2013/038812
PCT Pub. Date: Mar. 21, 2013

(65) Prior Publication Data
US 2014/0240822 A1 Aug. 28, 2014

(30) Foreign Application Priority Data

Sep. 12, 2011 (JP) ................................ 2011-197860

(51) Int. Cl.
*G02B 17/00* (2006.01)
*G02B 13/14* (2006.01)
(Continued)

(52) U.S. Cl.
CPC ................ *G02B 17/00* (2013.01); *B32B 7/02* (2013.01); *B32B 15/085* (2013.01); *B32B 15/20* (2013.01);
(Continued)

(58) Field of Classification Search
CPC ........... G02B 5/28; G02B 5/208; G02B 5/281; G02B 5/282; A47F 3/043; A47F 3/0434; A47F 3/005; B32B 2307/416; B32B 17/10174; B32B 17/10201; B32B 17/1022; B32B 17/10229; E06B 3/66; E06B 3/6715; E04C 1/42; E04C 2/54

See application file for complete search history.

(56) References Cited

U.S. PATENT DOCUMENTS 5,055,338 A * 10/1991 Sheth ...................... B29C 55/04
264/288.4
6,366,397 B1 * 4/2002 Genjima ................... F21V 9/04
359/359

(Continued)

FOREIGN PATENT DOCUMENTS

EP 0759566 A1 2/1997
JP 62-54955 B2 11/1987

(Continued)

OTHER PUBLICATIONS

International Search Report dated Oct. 30, 2012, issued in corresponding application No. PCT/JP2012/068716.
(Continued)

*Primary Examiner* — Donald J Loney
(74) *Attorney, Agent, or Firm* — Westerman, Hattori, Daniels & Adrian, LLP

(57) ABSTRACT

An infrared-reflective film includes a substrate film composed of a polyolefin film or a polycycloolefin film. The substrate film has two main surfaces and an infrared-reflective layer is formed on one main surface and the other main surface faces air, nitrogen gas, inert gas or a vacuum. A surface of the infrared-reflective layer faces either of air, nitrogen gas, inert gas or a vacuum.

20 Claims, 5 Drawing Sheets

(51) Int. Cl.
- *B32B 7/02* (2006.01)
- *B32B 15/085* (2006.01)
- *B32B 15/20* (2006.01)
- *B32B 27/32* (2006.01)
- *E06B 3/66* (2006.01)
- *E04C 2/54* (2006.01)
- *G02B 5/28* (2006.01)
- *E06B 3/67* (2006.01)
- *G02B 5/20* (2006.01)
- *A47F 3/00* (2006.01)
- *A47F 3/04* (2006.01)
- *E04C 1/42* (2006.01)
- *B32B 17/10* (2006.01)

(52) U.S. Cl.
CPC ............... *B32B 27/325* (2013.01); *G02B 5/28* (2013.01); *G02B 13/14* (2013.01); *A47F 3/005* (2013.01); *A47F 3/043* (2013.01); *A47F 3/0434* (2013.01); *B32B 17/10174* (2013.01); *B32B 17/10201* (2013.01); *B32B 2307/304* (2013.01); *B32B 2307/416* (2013.01); *B32B 2509/10* (2013.01); *B32B 2605/00* (2013.01); *E04C 1/42* (2013.01); *E04C 2/54* (2013.01); *E06B 3/66* (2013.01); *E06B 3/6715* (2013.01); *G02B 5/208* (2013.01); *G02B 5/281* (2013.01); *G02B 5/282* (2013.01)

(56) References Cited

U.S. PATENT DOCUMENTS

| | | |
|---|---|---|
| 2009/0237782 A1 | 9/2009 | Takamatsu et al. |
| 2012/0268810 A1 | 10/2012 | Ohmori et al. |
| 2014/0098414 A1 | 4/2014 | Ohmori et al. |

FOREIGN PATENT DOCUMENTS

| | | |
|---|---|---|
| JP | 2005-338395 A | 12/2005 |
| JP | 2006-30944 A | 2/2006 |
| JP | 2008-221732 A | 9/2008 |
| JP | 2011-100084 A | 5/2011 |
| JP | 2011-104887 A | 6/2011 |
| JP | 2012-128231 A | 7/2012 |
| JP | 2012-189683 A | 10/2012 |
| WO | 2007/049478 A1 | 5/2007 |

OTHER PUBLICATIONS

International Written Opinion of the Searching Authority dated Oct. 30, 2012, issued in corresponding application No. PCT/JP2012/068716.

Office Action dated Aug. 6, 2015, issued in counterpart Japanese Patent Application No. 2011-197860, with English translation (5 pages).

Extended European Search Report dated Mar. 26, 2015, issued in corresponding European Patent Application No. 12831893.8 (7 pages).

\* cited by examiner

PRIOR ART

PRIOR ART

INFRARED-REFLECTIVE FILM

BACKGROUND OF THE INVENTION

Field of the Invention

The present invention relates to an infrared-reflective film (heat reflective film).

Description of the Related Art

An infrared-reflective film is adhered to a building window, a vehicle window so as to be used to improve cooling or heating effect. Further, an infrared-reflective film is adhered to a window of a refrigerated (freezing) counter display to be also used to improve cold reserving effect.

FIG. 5 is a cross-sectional view of a conventional infrared-reflective film 70. In the conventional infrared-reflective film 70, an infrared-reflective layer 72 is formed on one surface of a substrate film 71 (transparent polymer film). The substrate film 71 is to be used as a base of lamination and a polyethylene terephthalate film is preferably used as the substrate film 71.

The infrared-reflective layer 72 is a laminated layer in which a metal thin layer is interposed between transparent dielectric layers respectively having a high reflective index. The infrared-reflective layer 72 transmits visible light, however, reflects infrared-reflective beams. The infrared-reflective layer 72 is formed on the substrate film 71 by a sputtering method or the like.

Far-infrared rays included in irradiation light 73 from above the infrared-reflective layer 72 are reflected by the infrared-reflective layer 72. Far-infrared rays included in irradiation light 74 from below the substrate film 71 are, however, mostly absorbed in the substrate film 71 as mentioned below.

Since polyethylene terephthalate contains plenty of C=O groups, C—O groups, and aromatic groups, the polyethylene terephthalate exhibits vibration absorption of a far-infrared region of 5 μm to 25 μm. Accordingly, polyethylene terephthalate has a property of absorbing far-infrared rays.

In the infrared-reflective film 70 shown in FIG. 5, a polyethylene terephthalate film is used as the substrate film 71. Accordingly, the substrate film 71 absorbs a part of far-infrared rays included in the irradiation light 74 from below the substrate film 71 to increase the temperature.

The temperature further increases because the substrate film 71 absorbs a part of far-infrared rays included in reflective light emitted to the lower side of the infrared-reflective layer 72. As a result, the irradiation light 74 from below the substrate film 71 is mostly absorbed in the substrate film 71. The substrate film 71 itself thereby re-emits infrared rays.

While the infrared-reflective film 70 shown in FIG. 5 reflects far-infrared rays when the irradiation light 73 comes from an infrared-reflective layer 72 side (upper side), the infrared-reflective film 70 does not reflect far-infrared rays when the irradiation light 74 comes from a substrate film 71 side (lower side). Accordingly, the infrared-reflective film 70 shown in FIG. 5 does not have enough infrared-reflective properties.

FIG. 6 is a cross-sectional view of another conventional infrared-reflective film 80 (Japanese Unexamined Patent Application Publication No. 2011-104887 A). In the infrared-reflective film 80 shown in FIG. 6, an infrared-reflective layer 82 and a protective layer 83 are formed on one surface of a substrate film 81. The substrate film 81 is a film to be a base of lamination and a polyethylene terephthalate film is preferably used as the substrate film 81.

The infrared-reflective layer 82 is a laminated layer in which a metal thin layer is interposed between transparent dielectric layers with a high refractive index. The infrared-reflective layer 82 transmits visible light. However, the infrared-reflective layer 82 reflects infrared-reflective rays. The infrared-reflective layer 82 is formed on the substrate film 81 by the sputtering method or the like.

In the infrared-reflective film 80 shown in FIG. 6, a polycycloolefin layer is used as a protective layer 83. Since the basic chemical constitution of polycycloolefin consists of carbon atom and hydrogen atom, polycycloolefin exhibits a little absorption of a far-infrared region. Accordingly, far-infrared rays included in irradiation light 84 from above the protection layer 83 reaches the infrared-reflective layer 82 without mostly being absorbed in the protective layer 83 to be reflected at the infrared-reflective layer 82. Far-infrared rays included in reflective light 85 reflected by the infrared-reflective layer 82 are also scarcely absorbed in the protective film 83 and are emitted outward. Accordingly, there is almost no increase in the temperature of the protective layer 83.

However, as mentioned below, far-infrared rays included in irradiation light 86 from below the substrate film 81 are mostly absorbed in the substrate film 81.

In the infrared-reflective film 80 shown in FIG. 6, a polyethylene terephthalate film is used as the substrate film 81. Accordingly, the temperature of the substrate film 81 rises by absorbing a portion of far-infrared rays included in irradiation light from below the substrate film 81. The temperature of the substrate film 81 further rises by absorbing a portion of far-infrared rays included in reflective light emitted to the lower side of the infrared-reflective layer 82. As a result, irradiation light 86 from below the substrate film 81 is mostly absorbed in the substrate film 81. This substrate film 81 itself thereby re-emits infrared rays.

While the infrared-reflective film 80 shown in FIG. 6 reflects far-infrared rays when the irradiation light 84 comes from a protective film layer 83 side (upper side), the infrared reflective film 80 does not reflect far-infrared rays when the irradiation light 86 comes from a substrate film 81 side (lower side). Consequently, the infrared-reflective film 80 shown in FIG. 6 does not have sufficient infrared-reflective properties.

FIG. 7 is a cross-sectional view showing still another conventional infrared-reflective film 90 (an infrared rays cut filter) (Japanese Unexamined Patent Application Publication No. 2006-30944 A). The infrared-reflective film 90 shown in FIG. 7 is a film in which infrared-reflective layers 92, 93 are formed on both surfaces of a substrate film 91 (a transparent resin film). The substrate film 91 is a film to be a base of lamination and a norbornene resin film or a polyether sulfonic resin film is used as the substrate film 91.

The infrared-reflective layers 92, 93 are both dielectric multi-layers, in which a dielectric layer A and a dielectric layer B with a refractive index higher than the dielectric layer A are alternately formed. Although the infrared-reflective layers 92, 93 allow visible light to transmit, the infrared-reflective layers 92, 93 reflect far-infrared rays. The infrared-reflective layers 92, 93 are formed on the substrate film 91 by the deposition evaporation method.

The infrared-reflective film 90 shown in FIG. 7 has the infrared-reflective layers 92, 93 on both surfaces thereof. Accordingly, regardless of a material of the substrate film 91, the infrared-reflective film 90 similarly reflects both far-infrared rays included in the irradiation light 94 emitted from the upper side and far-infrared rays included in the irradiation light 95 emitted from the lower side. Consequently, the infrared-reflective film 90 shown in FIG. 7 has superior infrared rays reflective properties.

However, it costs expensive to produce an infrared-reflective film 90 shown in FIG. 7 because the infrared-reflective layers 92, 93 have to be formed on both surfaces thereof.

Since the infrared-reflective film 90 shown in FIG. 7 has the infrared-reflective layers 92, 93 on both surfaces thereof, the infrared-reflective film 90 has a low transmittance of visible light. Accordingly, the room gets dark when the infrared-reflective film 90 is used for a window of a building. Further, when the infrared-reflective film 90 is adhered to a refrigerated (freezing) counter display, it becomes hard to see inside the refrigerated (freezing) counter display. Accordingly, the infrared-reflective film 90 shown in FIG. 7 has a drawback in practicability.

SUMMARY OF THE INVENTION

It is an object of the present invention to realize an infrared-reflective film whose production cost is low and which has a high transmittance of visible light, and superior practicability while having far-infrared reflective properties equivalent to those of the infrared-reflective film 90 shown in FIG. 7 having the infrared-reflective layers 92, 93.

The summary of the present invention is described as below.

In a first preferred aspect, there is provided an infrared-reflective film according to the present invention including a substrate film composed of a polyolefin film or a polycycloolefin film. The substrate film has two main surfaces. An infrared-reflective layer is formed on one main surface of the substrate film. A surface of the formed infrared-reflective layer faces either of air, nitrogen gas, inert gas or a vacuum. The other main surface of the substrate film faces either of air, nitrogen gas, inert gas or a vacuum. Atmospheric pressure of air, nitrogen gas, and inert gas is not limited to 1 atmospheric pressure, but may be higher than or lower than 1 atmospheric pressure.

In a second preferred aspect of the infrared-reflective film according to the present invention, the polyolefin film is a polyethylene film or a polypropylene film.

In a third preferred aspect of the infrared-reflective film according to the present invention, the polycycloolefin film is a polynorbornene film.

In a fourth preferred aspect of the infrared-reflective film according to the present invention, the infrared-reflective film has a normal emissivity of 0.40 or lower measured from a side of the infrared-reflective layer and a side of the substrate film, respectively.

In a fifth preferred aspect of the infrared-reflective film according to the present invention, the infrared-reflective film has a visible light transmittance of 50% or higher.

In a sixth preferred aspect of the infrared-reflective film according to the present invention, the infrared-reflective layer comprises a laminated layer composed of a metal thin layer and a high refractive index thin layer.

In a seventh preferred aspect of the infrared-reflective film according to the present invention, the metal thin layer is made of any one of gold, silver, copper, aluminum, palladium or an alloy of a combination thereof.

In an eighth preferred aspect of the infrared-reflective film according to the present invention, the high refractive index thin layer has a refractive index of 1.8 to 2.7.

In a ninth preferred aspect of the infrared-reflective film according to the present invention, the high refractive index thin layer is composed of any one of indium tin oxide (ITO), zinc oxide, titanium oxide, zirconium oxide, tin oxide, indium oxide or a combination thereof.

In a tenth preferred aspect, there is provided an infrared-reflective film mounting body including a plurality of frames and the infrared-reflective film according to the present invention. A plurality of edges of the infrared-reflective film are fixed to the plurality of frames.

In an eleventh preferred aspect, there is further provided an infrared-reflective film mounting body including a plurality of frames, the infrared-reflective film according to the present invention, and a glass plate or a transparent plastic plate. A plurality of edges of the infrared-reflective film are fixed to the plurality of frames. The transparent glass plate or the transparent plastic plate is fixed to the frames with a void interposed between the transparent glass plate or the transparent plastic plate and the infrared-reflective film. The void is filled with air, nitrogen gas or inert gas. Alternatively, the void is a vacuum.

In a twelfth preferred aspect, there is still further provided an infrared-reflective film mounting body including a plurality of frames, the infrared-reflective film according to the present invention, and a plurality of transparent glass plates or a plurality of transparent plastic plates. The plurality of transparent glass plates or the plurality of transparent plastic plates are fixed to the plurality of frames with respective voids interposed between the transparent plates or the transparent plastic plates and the infrared-reflective film. The respective voids are filled with air, nitrogen gas or inert gas. Alternatively, the voids are a vacuum, respectively. The infrared-reflective film according to the present invention is arranged in the voids between one transparent glass plate and the other transparent glass plate or the voids between one transparent plastic plate and the other transparent plastic plate. The infrared-reflective film according to the present invention is arranged so as not to be in contact with the plurality of transparent glass plates or the plurality of transparent plastic plates. A plurality of edges of the infrared-reflective film according to the present invention are fixed to the frames.

In a thirteenth preferred aspect, a refrigerated counter display or a freezing counter display according to the present invention includes the infrared-reflective film mounting body in a window.

In a fourteenth preferred aspect, a building of the present invention includes the infrared-reflective film mounting body in a window.

Advantages of the Invention

Although the infrared-reflective film of the present invention has an infrared-reflective layer only on one surface thereof, the infrared-reflective film of the present invention has the equivalent infrared-reflective properties to the infrared-reflective properties of the infrared-reflective film 90 having infrared-reflective layers on both surfaces thereof shown in FIG. 7. Since the infrared-reflective-film of the present invention has an infrared-reflective layer on one surface only, the production cost is low and the transmittance of visible light is high. Since the infrared-reflective film of the present invention has a high transmittance of visible light, it does not get dark inside the room even the infrared-reflective film is used for a window of a building. Further, even when the infrared-reflective film of the present invention is adhered to a window of a refrigerated (freezing) counter display, it is easily view inside the counter display.

BRIEF DESCRIPTION OF THE DRAWINGS

FIG. 1 (b) is a cross-sectional view of an infrared-reflective film mounting body of the present invention;

FIG. 2 (b) is a cross-sectional view of an infrared-reflective film mounting body of the present invention;

DESCRIPTION OF THE PREFERRED EMBODIMENTS

[Infrared-Reflective Film]

Figure 1A:
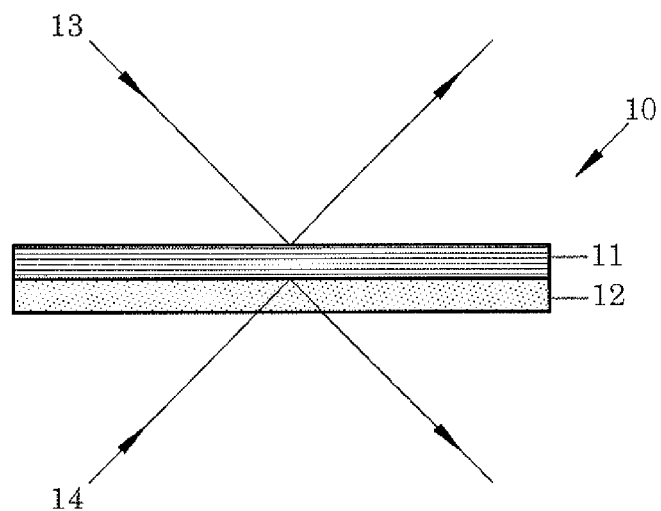
FIG. 1 (*a*) is a cross-sectional view of an infrared-reflective film of the present invention.
Figure 1B:
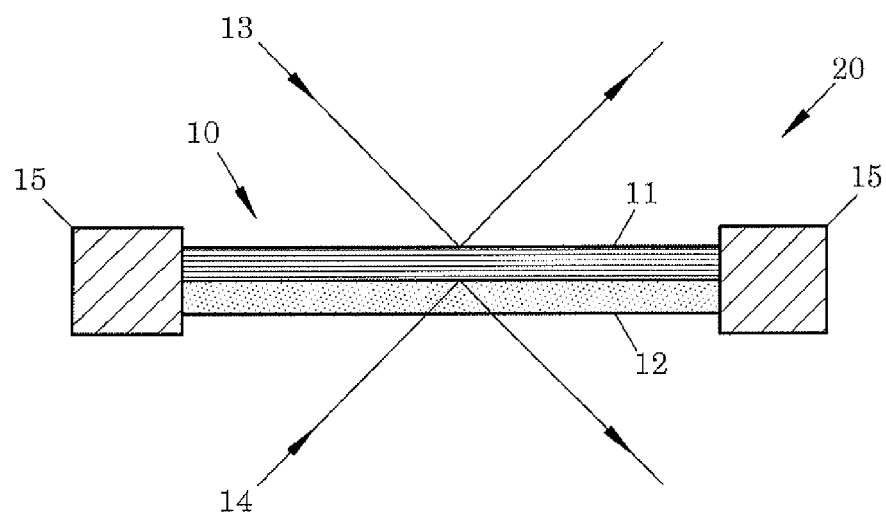

FIG. 1 (a) is a cross-sectional view of an infrared-reflective film 10 of the present invention. The infrared-reflective film 10 of the present invention comprises: a substrate film 12; and an infrared-reflective layer 11 formed on the entire one main surface of the substrate film 12. A surface (upper surface) of the infrared-reflective layer 11 and the other main surface (lower surface) of the substrate film 12 face any one of air, nitrogen gas, inert gas or a vacuum.

When irradiation light 13 is incident from an infrared-reflective layer 11 side (upper side), far-infrared rays included in the irradiation light 13 are reflected by the infrared-reflective layer 11. This makes the far-infrared rays included in the irradiation light 13 impossible to transmit the infrared-reflective film 10 of the present invention. Accordingly, for instance, when the infrared-reflective film 10 of the present invention is used to form a sealed space with the infrared-reflective layer 11 placed outside, the temperature inside the sealed space is changed little even the irradiation light 13 included in far-infrared rays is irradiated from the outside. Conversely, when a sealed space is created with the infrared-reflective layer 11 placed inside, the temperature inside the sealed space tends to rise because thermal energy in the sealed space is prevented from being discharged to the outside as far-infrared rays. That is, the infrared-reflective film 10 of the present invention has functions of an insulated film.

The substrate film 12 is a polyolefin film or a polycycloolefin film. In a polyolefin film and a polycycloolefin film, stretching vibration of its C—H group appears at a shorter wavelength side (mid infrared region) of infrared rays. Consequently, the polyolefin film and the polycycloolefin film hardly absorb far-infrared rays.

Accordingly, in the case where the irradiation light 14 is incident from a substrate film 12 side (lower side), far-infrared rays included in the irradiation light 14 reach the infrared-reflective layer 11 hardly absorbed in the substrate film 12.

Although the infrared-reflective layer 11 is in contact with the substrate film 12, infrared-reflective functions of the infrared-reflective layer 11 are not lost as mentioned below because the substrate film 12 is a polyolefin film or a polycycloolefin film. Accordingly, far-infrared rays which have passed through the substrate film 12 are reflected by the infrared-reflective layer 11 and then pass through the substrate film 12 again to emit outside. At this time, the substrate film 12 hardly absorbs far-infrared rays that pass through. As a result, far-infrared rays included in the irradiation light 14 are unable to transmit the infrared-reflective film 10 of the present invention. Therefore, for example, when a sealed space is created with the substrate film 12 arranged outside by using the infrared-reflective film 10 of the present invention, there are little increases inside the sealed space even when the irradiation light 14 including far-infrared rays is irradiated from outside. In contrast, a sealed space is created with the substrate film 12 arranged inside, in the case where there is a heat source inside the sealed space, thermal energy in the sealed space is prevented from being discharged outside as far-infrared rays, which leads to an easy increase in temperature inside the sealed space. Consequently, when a sealed space is created, the infrared-reflective film 10 of the present invention has insulating film functions regardless of whether the infrared-reflective layer 11 is arranged inside or outside.

In both cases where irradiation light 13 is incident from the infrared-reflective layer 11 side (upper side) and the irradiation light 14 is incident from the substrate film 12 side (lower side), it is possible to minimize the infrared rays emissivity of the infrared-reflective film 10. In both cases where measured from the infrared-reflective layer 11 side (upper side) and measured from the substrate film 12 side (lower side), the infrared-reflective film 10 preferably has a normal emissivity of 0.4 or lower, more preferably 0.2 or lower. As a result, the infrared-reflective film 10 of the present invention exhibits high thermal insulation properties.

[Infrared-Reflective Layer 11]

The infrared-reflective layer 11 to be used in the present invention transmits visible light and reflects infrared rays. The infrared-reflective layer 11 alone preferably has a visible light transmittance of 50% or higher. The infrared-reflective layer 11 alone preferably has a normal emissivity of 0.1 or lower.

The infrared-reflective layer 11 is a multi-layer obtained by generally laminating a plurality of thin layers and a plurality of high refractive index thin layers. A material for forming a metal thin layer is typically gold, silver, copper, aluminum, palladium and the like or an alloy thereof. The metal thin layer is adjusted to preferably have a thickness in the range of 5 nm to 1,000 nm so that both the visible light transmittance and the infrared ray reflectivity may be high.

The high refractive index thin layer is typically a titanium dioxide or a zirconium dioxide. The high refractive index thin layer preferably has a refractive index in the range of 1.8 to 2.7. Indium tin oxide (ITO), titanium oxide, zirconium oxide, tin oxide, indium oxide and the like or a combination thereof are respectively used as a material for forming a high refractive index thin layer. The high refractive index thin layer is so adjusted to preferably have a thickness in the range of 20 nm to 100 nm.

A metal thin layer and a high refractive index thin layer are typically formed by the sputtering method, the vacuum deposition method, and the plasma chemical vapor deposition method or the like. It is possible to tightly form the infrared-reflective layer 11 on the substrate film 12. The side that is in contact with the substrate film 12 may be either the metal thin layer or the high refractive index thin layer.

[Substrate Film 12]

The substrate film 12 to be used in the present invention is a polyolefin film or a polycycloolefin film. Polyolefin and polycycloolefin exhibit a little absorption of a far-infrared region. Accordingly, it is possible to increase the minimum transmittance of light (for instance, 50% or higher) in the range of a wavelength of 5 μm to 25 μm (far-infrared region) by adjusting the thickness of the substrate film 12.

Polyolefin to be used for the substrate film 12 is preferably polyethylene or polypropylene. Polycycloolefin to be used for the substrate film 12 is preferably polynorbornene.

The substrate film 12 preferably has a thickness of 10 μm to 150 μm. When the substrate film 12 has a thickness of less than 10 μm, there are fears that bearing properties of the infrared-reflective layer 11 may be lowered. On the other hand, when the substrate film 12 has a thickness of over 150 μm, as a result, absorption of light of the infrared region is increased and there are fears that thermal insulation may be lowered.

[Mounting Body of Infrared-Reflective Film 10]

The infrared-reflective film 10 shown in FIG. 1 (*a*) has no autonomy. Accordingly, as shown in FIG. 1 (*b*), an infrared-reflective film mounting body 20, in which a plurality of edges of the infrared-reflective film 10 were fixed to frames 15, was invented by inventors of the present invention.

Even when the plurality of edges of the infrared-reflective film 10 are fixed to the frames 15, there are no changes in infrared-reflective function. That is, in both cases where the irradiation light 13 is incident from the infrared-reflective layer 11 side (upper side) and the irradiation light 14 is incident from the substrate film 12 side (lower side), far-infrared rays included in the irradiation light 13, 14 are reflected.

Since the infrared-reflective film mounting body 20 shown in FIG. 1 (*b*) is exposed, it is not easy to use the infrared-reflective film mounting body 20 in a place where there is a possibility of directly being in contact with the infrared-reflective film 10.

Figure 2A:
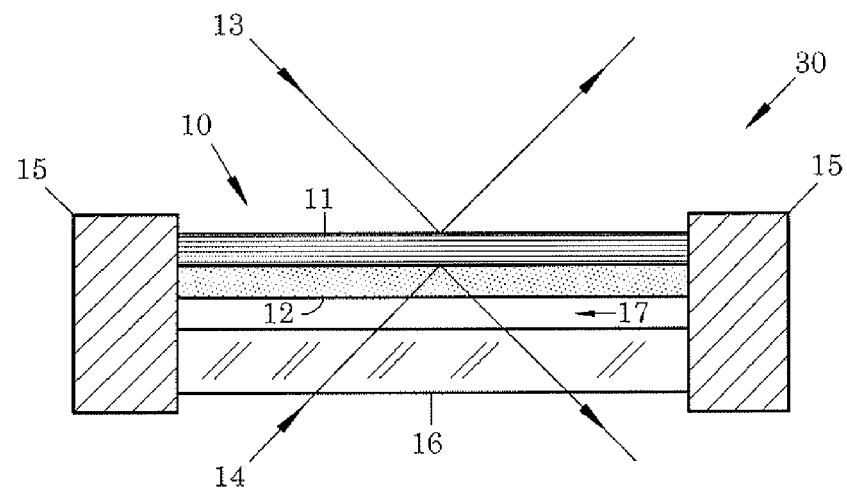
FIG. 2 (a) is a cross-sectional view of an infrared-reflective film mounting body of the present invention.
Figure 2B:
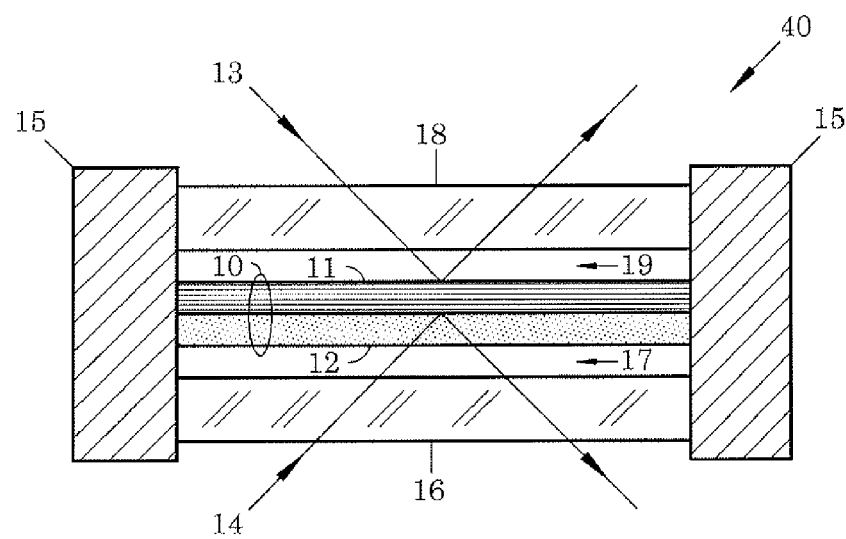

Accordingly, as shown in FIG. 2 (*a*), an infrared-reflective film mounting body 30, in which a transparent glass plate 16 was engaged with frames 15 as well as a plurality of edges of the infrared-reflective film 10 were fixed to the frames 15, was invented by the inventors of the present invention.

In the infrared-reflective film mounting body 30 shown in FIG. 2 (*a*), the glass plate 16 is arranged on one side of the infrared-reflective film 10. A transparent plastic plate (for example, an acrylic plate or a polycarbonate plate) may be used in place of the transparent glass plate 16. Such a transparent plate is herein typically referred to as a glass plate 16.

In FIG. 2 (*a*), while a glass plate 16 is arranged on the substrate film 12 side of the infrared-reflective film 10, the glass plate 16 may be arranged on the infrared-reflective layer 11 side by reversing the front and back of the infrared-reflective film 10.

An important thing in the infrared-reflective film mounting body 30 shown in FIG. 2 (*a*) is that a void is interposed between the infrared-reflective film 10 and the glass plate 16 to prevent the infrared-reflective film 10 from being in contact with the glass plate 16. The void between the infrared-reflective film 10 and the glass plate 16 may be filled with air, nitrogen gas or inert gas or the void may be a vacuum. The void between the infrared-reflective film 10 and the glass plate 16 is herein typically referred to as an air layer 17.

Generally, the infrared-reflective layer 11 reflects infrared rays only when a surface of the infrared-reflective layer 11 is in contact with air, nitrogen gas, inert gas or a vacuum. That is, when the infrared-reflective layer 11 is in contact with a polymer film, a glass plate or an adhesive and a pressure-sensitive adhesive, functions to reflect infrared rays are lost on a side which is in contact therewith. Consequently, it is needed for the infrared-reflective layer 11 not to be in contact with the polymer film, the glass plate or the adhesive and the pressure-sensitive adhesive.

However, when the infrared-reflective layer 11 is in contact with a polyolefin film or a polycycloolefin film, the infrared-reflective layer 11 does not exceptionally lose functions to reflect infrared rays. Consequently, the polyolefin film and the polycycloolefin film may be both used as the film substrate 12 when the infrared-reflective layer 11 is formed. More specifically, when the polyolefin film and the polycycloolefin film are both used as the substrate film 12, it is possible to reflect far-infrared rays included in irradiation light emitted from the substrate film 12 side.

However, it is impossible to use a general polymer film such as a polyethylene terephthalate film as a substrate film for forming the infrared-reflective layer. When a polyethylene terephthalate film is used as a substrate film, it is impossible to reflect far-infrared rays included in irradiation light from the substrate film side because functions to reflect infrared rays are lost at a side which is in contact with the substrate film of the infrared-reflective layer.

In the infrared-reflective film mounting body 30 shown in FIG. 2 (*a*), the irradiation light 13 from (above) the infrared-reflective film 10 directly shines on the infrared-reflective film 10. As a result, far-infrared rays included in the irradiation light 13 are reflected by the infrared-reflective layer 11.

In the infrared-reflective film mounting body 30 shown in FIG. 2 (*a*), the irradiation light 14 from (below) the glass plate 16 shines on the infrared-reflective film 10 after passing through the glass plate 16 and the air layer 17. Far-infrared rays included in the irradiation light 14 are reflected by the infrared-reflective film 10 and then pass through the air layer 17 and the glass plate 16 to emit to the lower side.

In such a manner, in the infrared-reflective film mounting body 30 shown in FIG. 2 (*a*), both far-infrared rays included in the irradiation light 13 from (above) the infrared-reflective film 10 and far-infrared rays included in the irradiation light 14 from (below) the glass plate 16 are reflected by the infrared-reflective film 10.

To further improve practicability, in an infrared-reflective film mounting body 40, as shown in FIG. 2 (*b*), two glass plates 16, 18 are fixed to the frames 15 with respective voids interposed therebetween to arrange the infrared-reflective film 10 in the respective voids. The infrared-reflective film 10 is so arranged not to come in contact with the glass plates 16, 18 and a plurality of edges thereof are fixed to the frames 15.

In the infrared-reflective film mounting body 40 shown in FIG. 2 (*b*), there are no fears that a person may directly contact the infrared-reflective film 10 because the infrared-reflective film 10 is separated and protected by the two glass plates 16, 18. Accordingly, the infrared-reflective film mounting body 40 shown in FIG. 2 (*b*) is highly practicable.

Similarly, in the infrared-reflective film mounting body 40 shown in FIG. 2 (*b*), a space is respectively created between the infrared-reflective film 10 and the glass plate 16 and between the infrared-reflective film 10 and the glass plate 18 to prevent the infrared-reflective film 10 from coming in contact with the glass plates 16, 18. Each space between the infrared-reflective film 10 and the glass plate 16 and between the infrared-reflective film 10 and the glass plate 18 may be filled with air, nitrogen gas or inert gas or may be a vacuum. Respective spaces between the infrared-reflective film 10 and the glass plate 16 and between the infrared-reflective film 10 and the glass plate 18 are herein typically referred to as air layers 17, 19.

In the infrared-reflective film mounting body 40 shown in FIG. 2 (*b*), the irradiation light 13 from the upper side shines on the infrared-reflective film 10 after passing through the glass plate 18 and the air layer 19. Far-infrared rays included in the irradiation light 13 are reflected by the infrared-reflective film 10 and then pass through the air layer 19 and the glass plate 18 and emit to the upper side.

In the infrared-reflective film mounting body 40 shown in FIG. 2 (*b*), the irradiation light 14 from the lower side shines on the infrared-reflective film 10 after passing through the glass plate 16 and the air plate 17. Far-infrared rays included in the irradiation light 14 are reflected by the infrared-reflective film 10 and then pass through the air layer 17 and the glass plate 16 and emit to the lower side.

In this way, in the infrared-reflective film mounting body 40 shown in FIG. 2 (*b*), both far-infrared rays included in the irradiation light 13 come from the upper side and far-infrared rays included in the irradiation light 14 come from the lower side are reflected by the infrared-reflective film 10.

Figure 3:
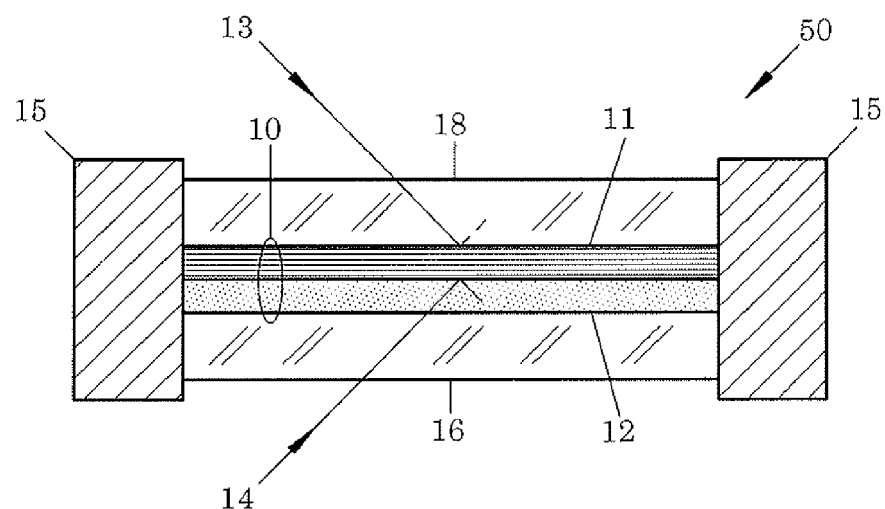
FIG. 3 is a cross-sectional view of an infrared-reflective film mounting body of a reference example.

An infrared-reflective film mounting body 50 shown in FIG. 3 is a reference example. The infrared-reflective film mounting body 50 shown in FIG. 3 is obtained by removing the air layers 17, 19 from the infrared-reflective film mounting body 40 shown in FIG. 2 (*b*). Accordingly, the infrared-reflective film 10 is in contact with the glass plates 16, 18. In the infrared-reflective mounting body 50 without an air layer like FIG. 3, capability to reflect far-infrared rays in the infrared-reflective film 10 is lost.

Consequently, the infrared-reflective film mounting body 50 without an air layer between the infrared-reflective film 10 and the glass plate 16 and between the infrared-reflective film 10 and the glass plate 18 as shown in FIG. 3 is not capable to reflect far-infrared rays included in the irradiation light 13, 14. As a result, the infrared-reflective film mounting body 50 shown in FIG. 3 lacks practicability.

EXAMPLES

Example 1

An infrared-reflective layer was formed by alternately laminating an ITO (indium tin oxide) layer with a thickness of 35 nm and an APC (silver-palladium-copper) layer with a thickness of 15 nm on a polynorbornene film with a thickness of 23 μm (ZEONORFilm produced by ZEON CORPORATION) using the radio-frequency magnetron sputtering method to obtain an infrared-reflective film. The ITO layer is an indium tin oxide layer. The APC layer is an alloy layer of 98% by weight of silver, 1% by weight of palladium, and 1% by weight of copper.

Example 2

An infrared-reflective layer was formed by alternately laminating an ITO (indium tin oxide) layer with a thickness of 35 nm and an APC (silver-palladium-copper) layer with a thickness of 15 nm on a polynorbornene film with a thickness of 40 μm (ZEONORFilm produced by ZEON CORPORATION) using the radio-frequency magnetron sputtering method to obtain an infrared-reflective film.

Example 3

An infrared-reflective layer was formed by alternately laminating an ITO (indium tin oxide) layer with a thickness of 35 nm and an APC (silver-palladium-copper) layer with a thickness of 15 nm on a polynorbornene film with a thickness of 100 μm (ZEONORFilm produced by ZEON CORPORATION) using the radio-frequency magnetron sputtering method to obtain an infrared-reflective film.

Example 4

An infrared-reflective layer was formed by alternately laminating an ITO (indium tin oxide) layer with a thickness of 35 nm and an APC (silver-palladium-copper) layer with a thickness of 15 nm on a polynorbornene film with a thickness of 7 μm using the radio-frequency magnetron sputtering method to obtain an infrared-reflective film. The polynorbornene film with a thickness of 7 μm was produced by simultaneously biaxial stretching a polynorbornene film with a thickness of 23 μm (ZEONORFilm produced by ZEON CORPORATION).

Example 5

An infrared-reflective layer was formed by alternately laminating an ITO (indium tin oxide) layer with a thickness of 35 nm and an APC (silver-palladium-copper) layer with a thickness of 15 nm on a polypropylene film with a thickness of 10 μm (produced by Toray Industries, Inc.) using the radio-frequency magnetron sputtering method to obtain an infrared-reflective film.

Example 6

An infrared-reflective layer was formed by laminating an Au layer with a thickness of 30 nm on a polynorbornene film with a thickness of 23 μm (ZEONORFilm produced by ZEON CORPORATION) using the radio-frequency magnetron sputtering method to obtain an infrared-reflective film.

Example 7

An infrared-reflective layer was formed by laminating an Al layer with a thickness of 30 nm on a polynorbornene film with a thickness of 23 μm (ZEONORFilm produced by ZEON CORPORATION) using the radio-frequency magnetron sputtering method to obtain an infrared-reflective film.

Comparative Example 1

An infrared-reflective layer was formed by alternately laminating an ITO (indium tin oxide) layer with a thickness of 35 nm and an APC (silver-palladium-copper) layer with a thickness of 15 nm on a polyethylene terephthalate film with a thickness of 25 μm (Diafoil produced by MITSUBISHI PLASTICS, INC.) using the radio-frequency magnetron sputtering method to obtain an infrared-reflective film.

Comparative Example 2

An infrared-reflective layer was formed by alternately laminating an ITO (indium tin oxide) layer with a thickness of 35 nm and an APC (silver-palladium-copper) layer with a thickness of 15 nm on a glass plate with a thickness of 1.1 mm using the radio-frequency magnetron sputtering method to obtain an infrared-reflective plate.

Comparative Example 3

The infrared-reflective film obtained in Example 5 was adhered to a glass plate with a thickness of 1.1 mm with intervention of an acrylic adhesive with a thickness of 20 µm to obtain an infrared-reflective plate.

[Evaluation]

Table 1 shows emissivity and temperatures in an insulated box of the infrared-reflective film (infrared-reflective plate) respectively obtained in Examples 1 to 7 and Comparative Examples 1 to 3.

tive film 63 (infrared-reflective plate) in the insulated box 60 was measured with the thermocouple 62.

The more thermal insulation of the infrared-reflective film 63 (infrared-reflective plate) is superior, the more the temperature in the insulated box 60 is higher. The thermal insulation of the infrared-reflective film 63 was evaluated in accordance with the temperature in the insulated box 60.

TABLE 1

| | Substrate film | | | Normal | Heat |
|---|---|---|---|---|---|
| | Material | Thickness (µm) | Infrared-reflective layer | emissivity (substrate side) | Insulation Test (° C.) |
| Example 1 | Polynorbornene | 23 | ITO/APC/ITO | 0.16 | 59.1 |
| Example 2 | Polynorbornene | 40 | ITO/APC/ITO | 0.21 | 58.9 |
| Example 3 | Polynorbornene | 100 | ITO/APC/ITO | 0.37 | 58.3 |
| Example 4 | Polynorbornene | 7 | ITO/APC/ITO | 0.10 | 59.6 |
| Example 5 | Polypropylene | 10 | ITO/APC/ITO | 0.10 | 60.0 |
| Example 6 | Polynorbornene | 23 | Au | 0.15 | 59.2 |
| Example 7 | Polynorbornene | 23 | Al | 0.19 | 59.0 |
| Comparative Example 1 | Polyethylene terephthalate | 25 | ITO/APC/ITO | 0.58 | 57.6 |
| Comparative Example 2 | Glass | 1,100 | ITO/APC/ITO | 0.89 | 57.1 |
| Comparative Example 3 | Polypropylene Acrylic pressure-sensitive adhesive Glass | 10 20 1,100 | ITO/APC/ITO | 0.91 | 56.9 |

The ITO in Table 1 is Indium Tin Oxide. The APC is an alloy layer of 98% by weight of silver, 1% by weight of palladium, and 1% by weight of copper.

As shown in Table 1, infrared-reflective films in Examples 1 to 7 respectively have a temperature higher than infrared-reflective films (infrared-reflective plate) in Comparative Examples 1 to 3 have and have high insulation effects.

[Measuring Method]
[Normal Emissivity]

A regular reflectance of infrared light at a wavelength of 5 µm to 25 µm was measured using a Fourier transform infrared spectrometer (FT-IR) (FTS7000S) equipped with an angular adjusting reflective accessory produced by VARIAN, INC. to determine a normal emissivity in accordance with JIS (Japanese Industrial Standards) R 3106-2008 (a testing method of transmittance, reflectivity, emissivity, and solar radiation heat gain coefficient of a plate glass kind).

[Visible Light Transmittance]

A visible light transmittance of an infrared-reflective film was measured by using a spectrophotometer U-4100 produced by Hitachi High-Technology Corporation in accordance with the JIS A 5759-2008 (a film for architectural window).

[Thermal Insulation]

Figure 4:
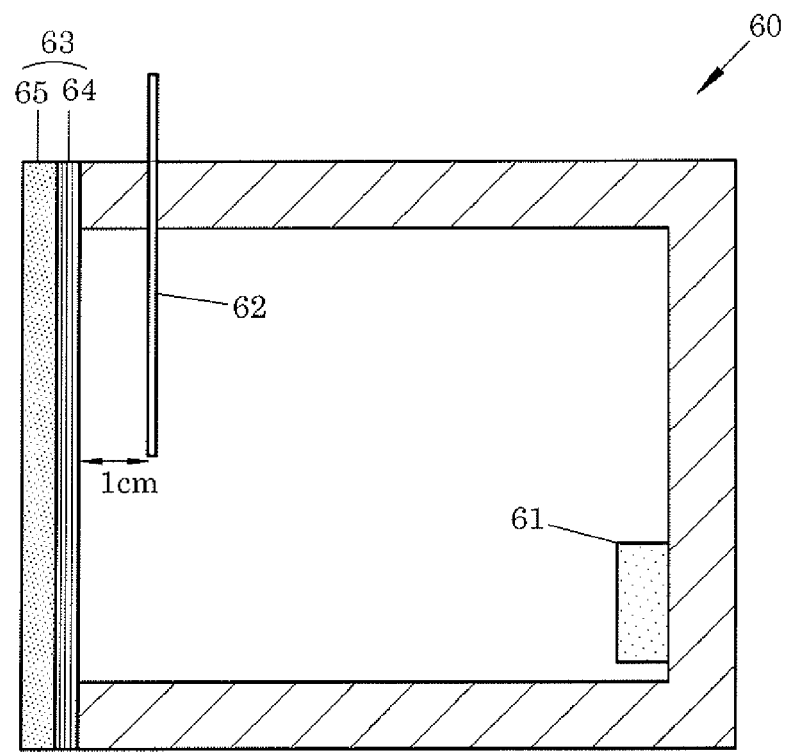
FIG. 4 is a cross-sectional view of an insulated measuring device.
Figure 5:
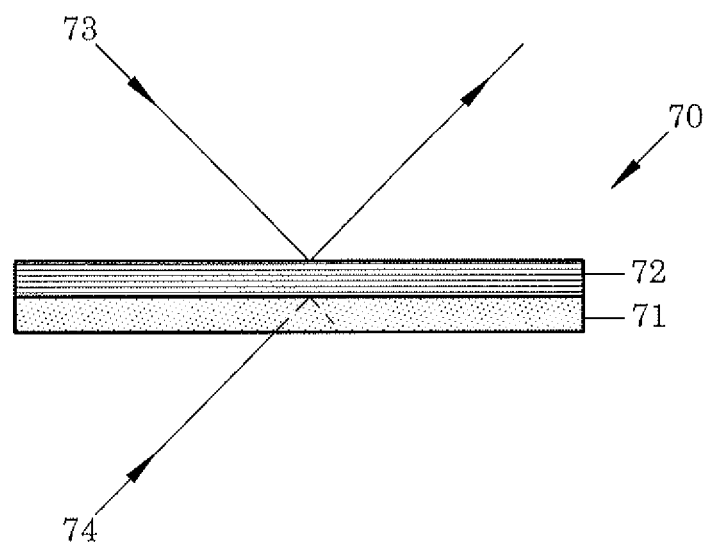
FIG. 5 is a cross-sectional view of a conventional infrared-reflective film.
Figure 6:
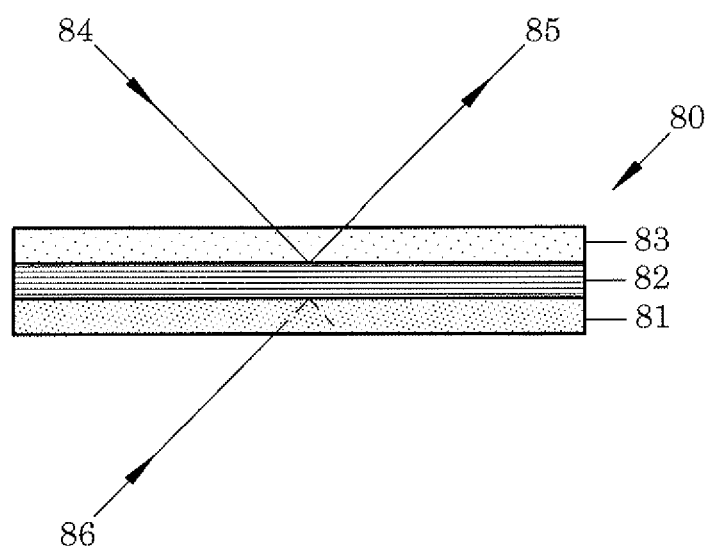
FIG. 6 is a cross-sectional view of a conventional infrared-reflective film.
Figure 7:
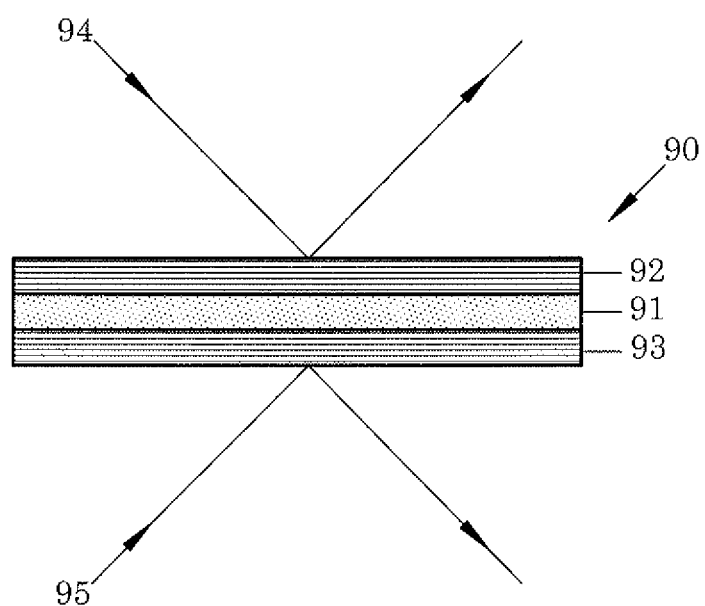
FIG. 7 is a cross-sectional view of a conventional infrared-reflective film.

FIG. 4 shows an insulation measuring device. As shown in FIG. 4, an infrared-reflective film 63 (infrared-reflective plate) in Examples 1 to 7 and Comparative Examples 1 to 3 was attached to an opening of an insulated box 60 with a heater 61 and a thermocouple 62 so as to tightly seal the insulated box 60. At this time, an infrared-reflective layer 64 of the infrared-reflective film 63 was arranged inside and a substrate film 65 was arranged outside. The inner dimensions of the insulated box 60 are 10 cm×10 cm×14 cm. The wall of the insulated box 60 (insulated material: Kane Light Foam produced by KANEKA CORPORATION) has a thickness of 20 mm.

The inside of the insulated box 60 was heated by the heater 61 having constant output and the temperature in a portion having a distance of 1 cm from the infrared-reflec-

INDUSTRIAL APPLICABILITY

Uses of the infrared-reflective film and the infrared-reflective film mounting body of the present invention are not particularly limited. The infrared-reflective film mounting body of the present invention is typically used for a window of a building or a vehicle or the like, a transparent case for putting plants into it, and a refrigerated counter display or a freezing counter display to be used to improve cooling and heating effects and prevent rapid temperature changes.

What is claimed is:

1. An infrared-reflective film mounting body, comprising:
    a plurality of frames;
    an infrared-reflective film comprising:
        a substrate film having two main surfaces composed of a polycycloolefin film; and
        an infrared-reflective layer formed on at least one of the two main surfaces of the substrate film; and
    one of a transparent glass plate and a transparent plastic plate,
    a plurality of edges of the infrared-reflective film are fixed to the plurality of frames,
    one of the transparent glass plate and the transparent plastic plate is fixed to the frames with a void interposed between the transparent glass plate or the transparent plastic plate and the infrared-reflective film, and
    the void is filled with air, nitrogen gas or inert gas, or the void is a vacuum.

2. An infrared-reflective film mounting body, comprising:
    a plurality of frames;
    an infrared-reflective film comprising:
        a substrate film having two main surfaces composed of a polycycloolefin film; and
        an infrared-reflective layer formed on at least one of the two main surfaces of the substrate film; and
    a plurality of transparent glass plates or a plurality of transparent plastic plates, the plurality of transparent glass plates or the plurality of transparent plastic plates are respectively fixed to the plurality of frames with respective voids interposed between the transparent glass plates or the transparent plastic plates and the infrared-reflective film, the respective voids are filled with air, nitrogen gas or inert gas, or the voids are a vacuum, respectively, the infrared-reflective film is arranged in the voids so as not to be in contact with the transparent glass plates or the transparent plastic plates, and a plurality of edges of the infrared-reflective film are fixed to the frames.

3. A refrigerated counter display or a freezing counter display including the infrared-reflective film mounting body according to claim 1 in a window.

4. A building including the infrared-reflective film mounting body according to claim 1 in a window.

5. The infrared-reflective film mounting body according to claim 1, wherein the polycycloolefin film is a polynorbornene film.

6. The infrared-reflective film mounting body according to claim 2, wherein the polycycloolefin film is a polynorbornene film.

7. The infrared-reflective film mounting body according to claim 1, having a normal emissivity of 0.4 or lower measured from a side of the infrared-reflective layer and a side of the substrate film, respectively.

8. The infrared-reflective film mounting body according to claim 2, having a normal emissivity of 0.4 or lower measured from a side of the infrared-reflective layer and a side of the substrate film, respectively.

9. The infrared-reflective film mounting body according to claim 1, having a visible light transmittance of 50% or higher.

10. The infrared-reflective film mounting body according to claim 2, having a visible light transmittance of 50% or higher.

11. The infrared-reflective film mounting body according to claim 1, wherein the infrared-reflective layer comprises a laminated layer composed of a metal thin layer and a high refractive index thin layer.

12. The infrared-reflective film mounting body according to claim 2, wherein the infrared-reflective layer comprises a laminated layer composed of a metal thin layer and a high refractive index thin layer.

13. The infrared-reflective film mounting body according to claim 11, wherein the at least one metal thin layer is made of one selected from the group consisting of gold, silver, copper, aluminum, palladium and an alloy of a combination thereof.

14. The infrared-reflective film mounting body according to claim 12, wherein the at least one metal thin layer is made of one selected from the group consisting of gold, silver, copper, aluminum, palladium and an alloy of a combination thereof.

15. The infrared-reflective film mounting body according to claim 11, wherein the at least one high refractive index thin layer has a refractive index of 1.8 to 2.7.

16. The infrared-reflective film mounting body according to claim 12, wherein the at least one high refractive index thin layer has a refractive index of 1.8 to 2.7.

17. The infrared-reflective film mounting body according to claim 11, wherein the at least one high refractive index thin layer is composed of one selected from the group consisting of indium tin oxide (ITO), titanium oxide, zirconium oxide, tin oxide, indium oxide and a combination thereof.

18. The infrared-reflective film mounting body according to claim 12, wherein the at least one high refractive index thin layer is composed of one selected from the group consisting of indium tin oxide (ITO), titanium oxide, zirconium oxide, tin oxide, indium oxide and a combination thereof.

19. A refrigerated counter display or a freezing counter display including the infrared-reflective film mounting body according to claim 2 in a window.

20. A building including the infrared-reflective film mounting body according to claim 2 in a window.

* * * * *